United States Patent
Forlenzo et al.

(10) Patent No.: US 6,377,821 B2
(45) Date of Patent: *Apr. 23, 2002

(54) DISPLAY-BASED INTERFACE FOR A COMMUNICATION DEVICE

(75) Inventors: Donato Joseph Forlenzo, Manahawkin; Richard Y. Hsia, Holmdel; Frank William Lescinsky, Middletown; Ronald Joseph Scaletti, North Brunswick; Terry Spencer, Fair Haven; Emil Stefanacci, Freehold, all of NJ (US)

(73) Assignee: Avaya Technology Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,670

(22) Filed: Oct. 9, 1997

(51) Int. Cl.⁷ .............................................. H04B 1/40
(52) U.S. Cl. ..................... 455/566; 455/566; 455/550; 455/462
(58) Field of Search ...................... 455/566, 90, 575, 455/74.1, 564, 418, 550, 555, 462, 463; 379/433, 352, 353, 355.01; 345/133, 100

(56) References Cited

U.S. PATENT DOCUMENTS

| | | | | |
|---|---|---|---|---|
| 4,768,218 A | * | 8/1988 | Yorita | 455/463 |
| 5,390,233 A | * | 2/1995 | Jensen et al. | 455/555 |
| 5,436,954 A | * | 7/1995 | Nishiyama et al. | 455/566 |
| 5,509,048 A | * | 4/1996 | Meidan et al. | 455/564 |
| 5,594,778 A | * | 1/1997 | Schaupp, Jr. et al. | 455/418 |
| 6,047,197 A | * | 4/2000 | Jarrad | 455/566 |

FOREIGN PATENT DOCUMENTS

| | | | | |
|---|---|---|---|---|
| FI | WO97/31467 | * | 8/1997 | H04M/1/00 |
| WO | WO 97/35413 | * | 9/1997 | H04M/1/00 |

OTHER PUBLICATIONS

"Simon, Mobile Communications Made Simple", 1993 by Bell South, 1993.*

(List continued on next page.)

Primary Examiner—Dwayne Bost
Assistant Examiner—Sonny Trinh
(74) Attorney, Agent, or Firm—Ryan, Mason & Lewis, LLP

(57) ABSTRACT

A wireless handset or other communication device includes a user interface implemented with a display and a number of select buttons. The display provides an array of identifiers arranged in rows and columns, with the identifiers corresponding generally to lines or functions of a communication system. The display also provides a status indication for each of the identifiers. A status indicator for a line identifier may indicate whether the corresponding line is in use by the handset user, in use by another system user, or idle, while a status indicator for a function identifier may indicate whether the function is activated or deactivated by the handset user. The assignment of identifiers to lines or functions may be in accordance with a mapping from a wired system, and the status information may be supplied to the handset from a switch of the wired system. The handset includes at least one row select button for selecting a particular one of the rows of identifiers provided in the display, and at least one column select button for selecting a particular one of the columns of identifiers. The selection of a particular row and column indicates selection of a line or function associated with the corresponding identifier. The display may be configured such that all of the identifiers and the state of their corresponding status indicators are visible to the user whenever the handset is on.

29 Claims, 2 Drawing Sheets

OTHER PUBLICATIONS

Uniden NOR9500 Digital Wireless Phone with Norstar Interface, Product Literature, pp. 1–2, Uniden America Corp., Fort Worth, TX, 1995.

Uniden 900 MHz Wireless EXP 9600, Advertisement, Uniden America Corp., Fort Worth, TX.

Wirefree Option, Harris Digital Telephone Systems, Product Literature, pp. 1–4, Harris Corporation, Novato, CA.

Nortel Companion, "The Wireless Telephone System For Business," Product Literature, pp. 1–7, Northern Telecom, Richardson, TX, 1995.

* cited by examiner

DISPLAY-BASED INTERFACE FOR A COMMUNICATION DEVICE

FIELD OF THE INVENTION

The present invention relates generally to wireless telephone handsets and other communication devices, and more particularly to displays for use in such devices.

BACKGROUND OF THE INVENTION

Wireless communication is becoming increasing popular in a variety of applications. One important application is in business telephone systems, where wireless techniques are being used to allow employees at a given business facility to access their wired desktop telephone lines and corresponding telephone functions from portable handsets. The system in effect allows wired lines to be connected over wireless communication channels to the handsets, such that employees can, for example, field calls arriving at their desktop telephones from anywhere within the facility. This arrangement provides improved employee accessibility, and thus increased efficiency and productivity.

A significant problem in these and other wireless systems relates to configuration of the display and function keys on the portable handset. Since the employees need to carry the handsets with them in order to obtain the full benefit of the system, it is important for the handsets to be compact and lightweight. This would generally require that the handset incorporate a relatively simple display with a limited number of function keys. However, many employee desktop telephones support a large number of lines and functions. For optimal efficiency, a substantial number of these lines and functions should be accessible to a given employee through the portable handset. Moreover, the handset should be capable of displaying the status of the various lines and functions simultaneously. Providing these features using a conventional handset display would typically involve increasing the number of function buttons on the handset, as well as increasing the size of the display. Unfortunately, this increases the size and weight of the handset, making it more difficult to carry. Other conventional approaches require the user to reprogram certain buttons in order to access different desktop lines and functions, which is inefficient and inconvenient for the user. Conventional handsets thus fail to adequately resolve the contention between the need for desktop-like functionality and the need to limit handset size and weight.

A need therefore exists for an improved wireless handset which can provide access to an array of multiple lines and functions similar to those found on a desktop business telephone, without unduly increasing the size and weight of the handset or requiring excessive reprogramming.

SUMMARY OF THE INVENTION

A wireless handset or other communication device in accordance with an illustrative embodiment of the invention includes a user interface implemented with a display and a set of select buttons. The display includes an array of identifiers arranged in rows and columns, with each of the identifiers corresponding generally to possible lines or functions accessible to a user of the wireless system. Each of the identifiers has a status indicator associated with it. The lines and functions corresponding to identifiers in the display may be mapped from the lines and functions of a wired telephone system used in the same facility as the wireless handset. In order to access the line or function corresponding to the identifier at the intersection of a particular row and column in the display, the user selects that row and column by pressing row and column select buttons.

In accordance with another aspect of the invention, all of the identifiers and the state of their corresponding status indicators may be made visible to the user whenever the handset is on, such that the display provides the multiple line and function status information previously associated only with wired desktop telephones. For example, if an identifier corresponds to a line, its displayed status indicator will generally indicate whether the line is in use by the handset user, in use by another system user, or idle. If an identifier corresponds to a function, its displayed status indicator may indicate whether the handset user has activated or deactivated that function. The status information used in the handset to provide the status indications may be supplied from a switch of a wired telephone system. The handset may also include a line preselection feature which allows a line corresponding to a given one of the identifiers to be preselected prior to filly turning on the handset, such that the preselected line is automatically selected when the handset is fully turned on.

In one possible arrangement of handset selection buttons in accordance with the invention, a single row select button is used in conjunction with multiple column select buttons, with one column select button for each column of identifiers in the display. The user selects a desired line or function in a particular row and column of the display by repeatedly pressing the single row select button until the display indicates that the particular row is selected, and then pressing the corresponding column select button. In other possible arrangements, a single column select button may be used in conjunction with multiple row select buttons, with one row select button for each row of identifiers in the display. The user selects a line or function in a particular column of identifiers by repeatedly pressing the single column select button until the display indicates that the particular column is selected, and then selects a line or function in the particular row by pressing the corresponding row select button. Other arrangements may use single row and column select buttons for respective row and column selection. As previously noted, the display also provides status indications for each line and function identifier, such that a given user can determine from the display which lines are in use by that user, which lines are in use by another user, and which functions are activated or deactivated.

The invention provides a handset or other communication device which can access the large number of lines and functions typically associated with a desktop business telephone without requiring a corresponding increase in the number of buttons on the handset or the size of the handset display. Moreover, the status of all the lines and functions is made visible simultaneously to the user without the need to reprogram function buttons as in conventional wireless handsets. These and other features and advantages of the present invention will become more apparent from the accompanying drawings and the following detailed description.

DETAILED DESCRIPTION OF THE INVENTION

The invention will be illustrated below in conjunction with an exemplary handset for use in a wireless communication system. Although particularly well-suited for use in conjunction with a business telephone system, the invention is not limited to use with any particular type of communication system. The disclosed display and function selection techniques may be used in any application in which it is desirable to provide access to a large number of lines or functions using a limited number of buttons. For example, the invention may be applied to handsets for use in cellular and personal communication services (PCS) systems, and to other types of communication devices. The term "handset" as used herein should therefore be understood to include not only portable wireless handsets as in the illustrative embodiment but also other types of communication devices. The term "button" as used herein is intended to include any type of hard or soft key which is pressed or otherwise activated by a user to select a corresponding line or function, including icons or other representations on a pressure-sensitive or a "point-and-click" display of a personal digital assistant (PDA) or other electronic device. The term "line" as used herein is intended to include not only telephone lines but more generally any type of communication channel which it may be desirable to monitor in a display of a communication device.

Figure 1:
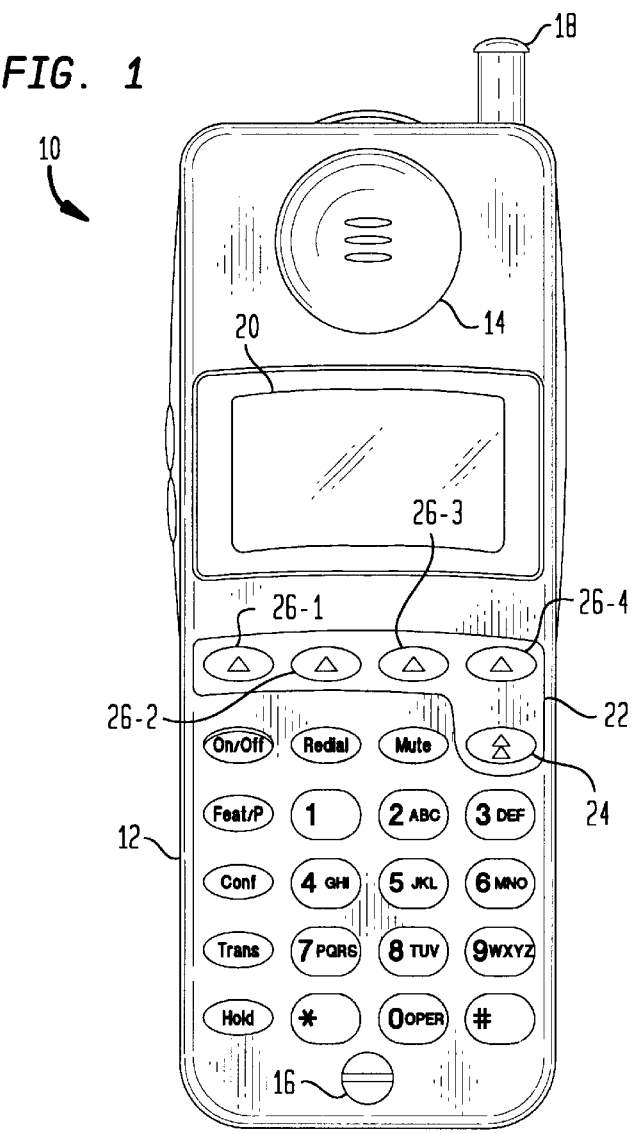
FIG. 1 shows a portable handset with a display and function buttons configured in accordance with an illustrative embodiment of the invention.

FIG. 1 shows a wireless handset 10 in accordance with an illustrative embodiment of the invention. The handset 10 includes a housing 12, a receiver 14, a microphone 16, an antenna 18 and a display 20. The handset 10 communicates with a base station of a wireless communication system in a well-known manner. The wireless communication system may be part of a wireless system within a business facility and used to implement business telephone functions. For example, the handset 10 may be configured to receive from the base station calls which are directed to a wired desktop telephone of the handset user. The user listens through receiver 14 and speaks into the microphone 16 in order to carry on a conversation with a caller. The handset 10 is shown in FIG. 1 as including a number of conventional buttons, including: alphanumeric buttons; "*" and "#" buttons; an "On/Off" button for turning the handset 10 on or off; a "Feat/P" button for enabling dial-code features or entering programming mode; a "Conf" button for enabling multi-line telephone conferences; a "Trans" button for transferring a call to another extension; a "Hold" button for placing a call on hold; a "Redial" button for re-dialing the last number entered in the handset; and a "Mute" button for turning off the microphone 16 for privacy.

The handset 10 also includes a set of additional buttons 22 which in conjunction with display 20 provide a user interface for selecting among different lines and functions. The additional buttons 22 include a row select button 24 and column select buttons 26-1, 26-2, 26-3 and 26-4. As will be described in greater detail below, the display 20 is arranged in accordance with the invention to include an array of selectable elements. Each element corresponds to a particular line or function which may be selected by the user via the buttons 22. In order to select a particular line or function in the display 20, the user pushes the row select button 24 until the row of the desired line or function is indicated, and then pushes the column select button of the column of the desired line or function. This process will be illustrated in greater detail in conjunction with FIGS. 3, 4, and 5 below. It should be noted that the handset 10 may include a microprocessor or other suitable electronic controller for directing the operations of the display, providing the functionality of the various buttons and implementing other functions of the handset. The microprocessor may operate in conjunction with internal or external random access memory (RAM), programmable read-only memory (ROM) or other suitable memory components in order to provide the display-based user interface features of the invention. These microprocessor and memory elements may be configured in a manner well known in the art and will therefore not be further described herein.

Figure 2:
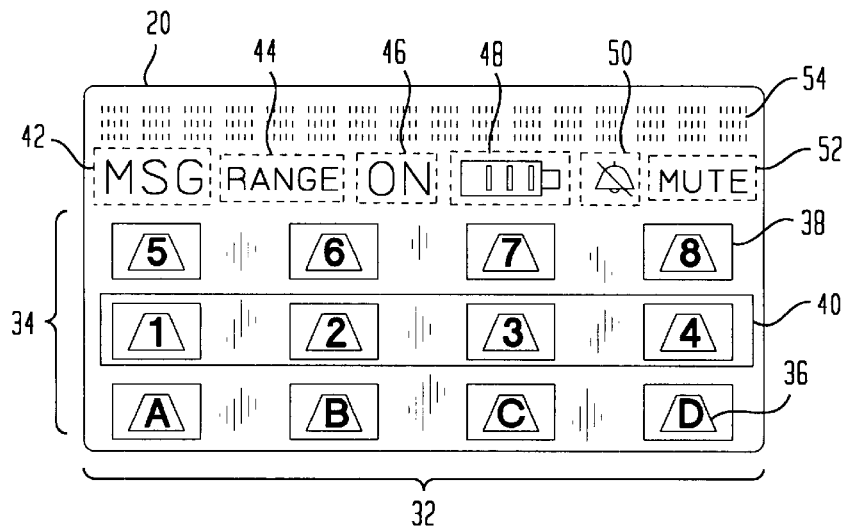
FIG. 2 illustrates the display of the handset of FIG. 1 in greater detail.

FIG. 2 shows a detailed view of the display 20 of handset 10. In this view, all of the possible elements of an exemplary display are shown as illuminated for clarity of illustration. Although certain of the elements, such as line or function identifiers, are generally always illuminated and visible to the user whenever the handset is on, other display elements, such as status indicators for particular lines or functions and status indicators for handset operating modes, are illuminated and visible to the user only when the corresponding conditions are present. For example, a "low battery" indicator in the display 20 will only be visible to the user when the low battery condition is present. It should therefore be understood that during normal usage typically only a subset of the display elements shown in FIG. 2 will actually be illuminated and visible to the user. The display 20 may be configured using conventional liquid crystal display (LCD) elements as is well known in the art. The display 20 may or may not be back-lit, and other types of displays may be also be used in place of display 20. The illustrated display elements include a matrix of twelve identifiers 1, 2, 3, . . . 8, A, B, C and D. Each of the identifiers specifies a particular line or function accessible to the user via the handset 10. The lines or functions may be assigned to the identifiers based on a mapping of lines and functions from a business telephone system in the facility in which the handset 10 is used. For example, the identifiers 1, 2, 3, . . . 8 may correspond to eight different lines of the business telephone system, while the identifiers A, B, C and D correspond to functions such as drop, do not disturb, recall, intercom or a programmable function. Numerous other configurations may also be used, in accordance with the requirements of a given application.

The twelve identifiers are arranged in this example as an array including four columns 32 and three rows 34. The display 20 also provides status indications for each line and function identifier, such that a given user can determine from the display which lines are in use by that user, which lines are in use by another user, which lines are idle and which functions are currently activated or deactivated. The status of a given identifier in this embodiment is indicated by a corresponding status indicator which is displayed with the indicator. For example, each of the identifiers 1, 2, 3, . . . 8, A, B, C and D may be surrounded by an indicator in the form of a "truncated" triangle 36 or by a rectangle 38. The truncated triangle 36 may be used to convey the information generally associated with a green light emitting diode (LED) indicator on a wired system telephone, while the rectangle 38 may be used to convey the information generally associated with a red LED indicator on the wired system telephone. The distinction between the truncated triangle 36 and the rectangle 38 will be described in greater detail in conjunction with FIG. 5 below.

A selection rectangle 40 is used to indicate to the user which of the three rows 34 is currently selected. In accordance with the invention, all of the identifiers and their corresponding status indicators are generally visible to the user whenever the handset 10 is on, such that the display 20 provides the multiple line and function status information typically associated only with wired desktop telephones. The status information used in handset 10 to provide the status indications may be supplied from a switch of a wired telephone system.

The exemplary display 20 further includes: an "MSG" indicator 42 for indicating if the user has a voice mail or other type of message; a "RANGE" indicator 44 which tells the user that the handset 10 is out of range or almost out of range of the wireless system; an "ON" indicator 46 for indicating that the handset 10 has been turned on; a battery icon 48 for warning of a low battery condition; a no ring icon 50 for indicating that the ringer or other alerter function is disabled; and a "MUTE" indicator 52 for indicating that the handset microphone 16 has been turned off. As previously noted, these indicators are displayed in display 20 when the corresponding conditions are present, and are otherwise not visible to the user. The upper portion of the display 20 includes a display line 54 which is capable of displaying information to the user in alphanumeric form. The information may be of a type found in the display of a wired desktop business telephone, and thus varies depending on the type of system being utilized. For example, the display line 54 may show the current date, the number being called, or caller identification information if it is supported by the system. The display line 54 may also be used for providing feedback when the user is testing or programming the handset 10.

Figure 3:
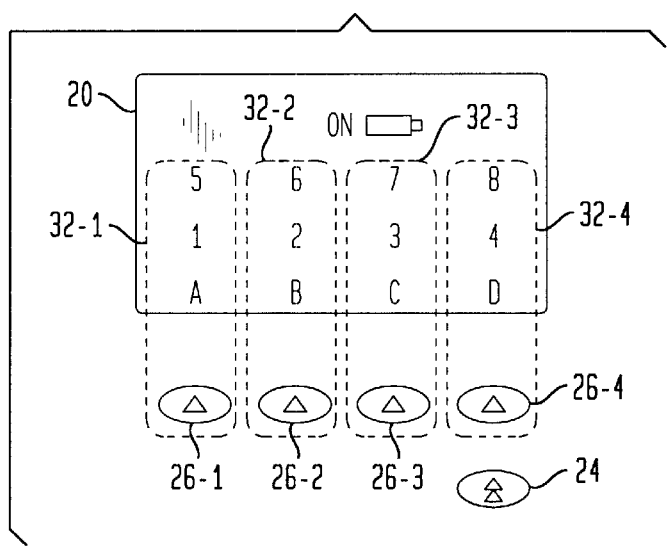
FIG. 3 illustrates the correspondence between column select buttons and columns of the display in accordance with the invention.

FIG. 3 shows the correspondence between the column select buttons 26-1, 26-2, 26-3 and 26-4 and the columns 32 of display 20. The dashed lines indicate that each of the individual columns 32-1, 32-2, 32-3 and 32-4 of the set of columns 32 corresponds generally to one of the column select buttons 26-1, 26-2, 26-3 and 26-4. Each of the column select buttons 26-n is used, in conjunction with the row select button 24, to select a line or function corresponding to one of the three identifiers directly above the column select button. For example, the column select button 26-1 is pressed when the user wants to select a line or function corresponding to identifier A, identifier 1 or identifier 5. The user presses row select button 24 to specify a particular one of the lines or functions corresponding to identifiers A, 1 or 5.

Figure 4:
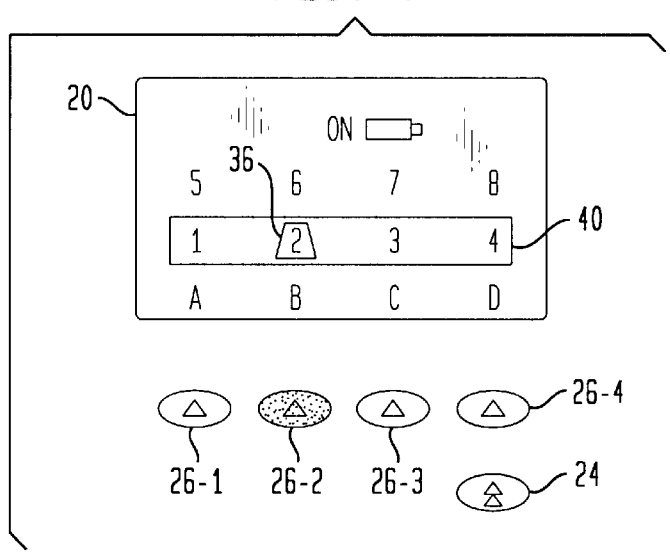
FIG. 4 illustrates the manner in which a particular identifier in a row and column of the handset display is selected in accordance with the invention.

FIG. 4 illustrates the selection process in greater detail. In this example, the user wants to select the line or function corresponding to identifier 2 in column 32-2. The user therefore presses the row select button 24 until the selection rectangle indicates that the second row is selected. Each time the row select button 24 is pressed, the selection rectangle moves to another row of the display 20, cycling through the three rows in turn. Alternative techniques may be used to indicate selection of a particular row of the display. For example, the selected row may be illuminated in a different color or level of brightness than the other rows. The user then selects the line or function corresponding to identifier 2 by pressing the column select button 26-2. The selection of a particular line or function corresponding to an identifier by pressing the row and column select buttons is indicated in display 20 by a truncated triangle 36 surrounding the particular identifier as shown. In some cases the indication provided by the truncated triangle 36 may be alternatively provided by rectangle 38 or other indicator based on the type of wired system with which the handset is operating.

Figure 5:
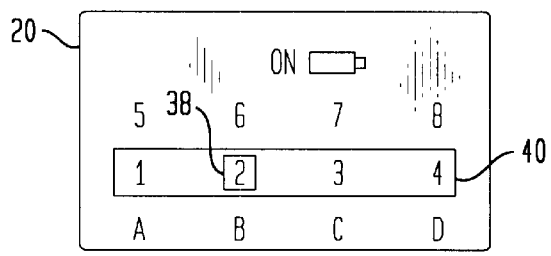
FIG. 5 shows an alternative view of a selected identifier in a row and column of the handset display.

FIG. 5 shows an illustration of display 20 corresponding to that of FIG. 4 but with a rectangle 38 surrounding the selected identifier, rather the truncated triangle 36. As noted above, the truncated triangle 36 may be used to implement the function provided by a green LED indicator in a standard wired business telephone, that is, to indicate that a particular line or function is actually selected by the user. Similarly, the rectangle 38 may be used to implement the function provided by a red LED indicator in a standard wired business telephone, that is, to indicate that a particular line or function is in use but not currently selected by the user. Moreover, each of the line or function identifiers in the display, and its corresponding status indication, may be made visible to the user at all times, regardless of the particular row or column selected.

In the example display of FIG. 4, the truncated triangle 36 surrounding identifier 2 indicates that the user has selected the corresponding line. In the example display of FIG. 5, the rectangle 38 surrounding identifier 2 indicates that the corresponding line is already in use, and that the user should therefore select another line. Other similar indicators could be used to indicate to the user that particular lines or functions are selected or otherwise in use. In addition, it should be noted that the indications provided by the triangle 36 and rectangle 38 may be reversed depending on the type of wired system with which handset 10 is operating. For example, the triangle 36 and rectangle 38 may provide indications similar to those provided by a green LED and a red LED, respectively, when handset 10 is operating with one type of wired system, while the indications are reversed such that triangle 36 and rectangle 38 provide indications provided by a red LED and a green LED, respectively, when handset 10 is operating with another type of wired system.

A handset or other telecommunication device in accordance with the invention may also be provided with a line preselection feature. The line preselection feature allows a line corresponding to a given one of the identifiers to be preselected prior to fully turning on the handset, such that the preselected line is automatically selected when the handset is fully turned on. This feature is particularly useful in embodiments in which the system is already configured to automatically connect the handset to a ringing line when the handset is turned on. In certain situations, it may be desirable for a user to be able to turn on the handset without the handset automatically connecting the user to the ringing line. For example, a user accustomed to receiving a large number of incoming calls may be prevented from making an important outgoing call at will if the handset automatically connects to the ringing line when turned on. The line preselection feature of the invention allows such a user to preselect a particular line using the column and row select buttons in the manner previously described. This preselection is generally made with the handset in a pre-on condition such that the display is activated but call answering functions are still off. After preselection, when the handset is fully turned on in the presence of ringing on another line, the handset will ignore the ringing line and connect the user to the preselected line. The user can thus make an important outgoing call at any time without being forced to first answer a less-important incoming call which happens to arrive at the same time.

The above-described embodiments of the invention are intended to be illustrative only. For example, alternative embodiments may utilize different types of displays to provide the row and column selection functions described in conjunction with FIGS. 3, 4 and 5. In addition, the lines or functions corresponding to the displayed identifiers may be mapped from any of a number of different telephone systems, and may include functions such as drop, do not disturb, recall, intercom as well as programmable functions, in any desired combination. Selection of a particular identifier or a particular row of identifiers in the display may be accomplished using techniques other than those described. For example, an alternative embodiment of the invention for use with the display 20 of FIG. 2 may include three row select buttons, one for each of the rows 34, and a single column select button for cycling through the different columns 32. In such an embodiment, a selection rectangle such as rectangle 40, or other similar technique, may be used to indicate selection of a particular column. As another example of an alternative embodiment, a single row select button may be used in conjunction with a single column select button, such that repeatedly pressing the row and column select buttons cycles through the respective rows and columns in the display. Selection rectangles or other indication mechanisms are used to indicate which row and column are selected. These and numerous other alternative embodiments within the scope of the following claims will be apparent to those skilled in the art.

What is claimed is:

1. An apparatus for implementing a user interface in a wireless telecommunication device of a communication system, the apparatus comprising:

a display providing a number of identifiers arranged in a plurality of rows and a plurality of columns, wherein at least a first subset of the identifiers each represents a communication line mapped from a related wired telephone of the system so as to be accessible through the wireless telecommunication device, the wired telephone being associated with a user of the wireless telecommunication device, and wherein at least a second subset of the identifiers each represents a function mapped from the related wired telephone of the system so as to be accessible through the wireless telecommunication device;

at least one row select button for selecting a particular one of the plurality of rows provided in the display; and at least one column select button for selecting a particular one of the plurality of columns provided in the display, such that selection of the particular row and the particular column is operative to select a feature associated with the corresponding identifier.

2. The apparatus of claim 1 further including a single row select button and a plurality of column select buttons, wherein the row select button when pressed repeatedly is operative to cycle through the plurality of rows.

3. The apparatus of claim 1 further including a single column select button and a plurality of row select buttons, wherein the column select button when pressed repeatedly is operative to cycle through the plurality of columns.

4. The apparatus of claim 1 further including a single row select button and a single column select button, wherein the row select button when pressed repeatedly is operative to cycle through the plurality of rows, and the column select button when pressed repeatedly is operative to cycle through the plurality of columns.

5. The apparatus of claim 1 wherein the telecommunication device is a handset of a wireless system, and the identifiers each correspond to a line or a function of the wireless system.

6. The apparatus of claim 1 wherein the telecommunication device is a handset of a wireless system, and lines or functions are assigned to the identifiers in accordance with a mapping from a wired telephone system.

7. The apparatus of claim 1 wherein the display is operative to provide a status indication for each of the displayed identifiers, and the status information used to provide the status indications is supplied from a switch of a wired telephone system.

8. The apparatus of claim 1 wherein a line corresponding to a given one of the identifiers is preselected prior to turning on the device, such that the preselected line is automatically selected when the device is turned on.

9. The apparatus of claim 1 wherein the display is operative to indicate to a user which of the plurality of rows is selected at a given time.

10. The apparatus of claim 1 wherein the display is operative to indicate to a user which of the plurality of columns is selected at a given time.

11. The apparatus of claim 1 wherein the display is operative to indicate to a user which line or function corresponding to an identifier is selected at a given time.

12. A method for implementing a user interface in a wireless telecommunication device of a communication system, the method comprising the steps of:

displaying a number of identifiers arranged in a plurality of rows and a plurality of columns, wherein at least a first subset of the identifiers each represents a communication line mapped from a related wired telephone of the system so as to be accessible through the wireless telecommunication device, the wired telephone being associated with a user of the wireless telecommunication device, and wherein at least a second subset of the identifiers each represents a function mapped from the related wired telephone of the system so as to be accessible through the wireless telecommunication device;

utilizing at least one row select button to select a particular one of the plurality of rows provided in the display; and utilizing at least one column select button to select a particular one of the plurality of columns provided in the display, such that selection of the particular row and the particular column selects a feature associated with the corresponding identifier.

13. The method of claim 12 further including the step of utilizing a single row select button to cycle through the plurality of rows.

14. The method of claim 12 further including the step of utilizing a single column select button to cycle through the plurality of columns.

15. The method of claim 12 wherein the displaying step further includes displaying a status indication for each of the identifiers, and the status information used to provide the status indications is supplied from a switch of a wired telephone system.

16. The method of claim 12 further including the step of preselecting a line corresponding to a given one of the identifiers prior to turning on the device, such that the preselected line is automatically selected when the device is turned on.

17. The method of claim 12 wherein the displaying step includes indicating to a user which of the plurality of rows is selected at a given time.

18. The method of claim 12 wherein the displaying step includes indicating to a user which of the plurality of columns is selected at a given time.

19. The method of claim 12 wherein the displaying step includes indicating to a user which line or function corresponding to an identifier is selected at a given time.

20. A wireless handset for use in a communication system, comprising:

a housing;

a display arranged in the housing, the display providing a number of identifiers arranged in a plurality of rows and a plurality of columns, wherein at least a first subset of the identifiers each represents a communication line mapped from a related wired telephone of the system so as to be accessible through the wireless handset, the wired telephone being associated with a user of the wireless handset, and wherein at least a second subset of the identifiers each represents a function mapped from the related wired telephone of the system so as to be accessible through the wireless communication device;

at least one row select button for selecting a particular one of the plurality of rows provided in the display; and at least one column select button for selecting a particular one of the plurality of columns provided in the display, such that selection of the particular row and the particular column selects a feature associated with the corresponding identifier.

21. The handset of claim 20 further including a single row select button and a plurality of column select buttons, wherein the row select button when pressed repeatedly is operative to cycle through the plurality of rows.

22. The handset of claim 20 further including a single column select button and a plurality of row select buttons, wherein the column select button when pressed repeatedly is operative to cycle through the plurality of columns.

23. The handset of claim 20 further including a single row select button and a single column select button, wherein the row select button when pressed repeatedly is operative to cycle through the plurality of rows, and the column select button when pressed repeatedly is operative to cycle through the plurality of columns.

24. The handset of claim 20 wherein lines or functions are assigned to the identifiers in accordance with a mapping from a wired telephone system.

25. The handset of claim 20 wherein the display further provides a status indication for each of the displayed identifiers, and the status information used to provide the status indications is supplied from a switch of a wired telephone system.

26. The handset of claim 20 wherein a line corresponding to a given one of the identifiers is preselected prior to turning on the handset, such that the preselected line is automatically selected when the handset is turned on.

27. An apparatus for implementing a user interface in a wireless telecommunication device of a communication system, the apparatus comprising:

a display providing a number of identifiers arranged in a plurality of rows and a plurality of columns, wherein at least a subset of the identifiers each represent a communication line or a function mapped from a related wired device of the system so as to be accessible through the wireless telecommunication device;

at least one row select button for selecting a particular one of the plurality of rows provided in the display; and atleast one column select button for selecting a particular one of the plurality of columns provided in the display, such that selection of the particular row and the particular column is operative to select a feature associated with the corresponding identifier;

wherein a line corresponding to a given one of the identifiers is preselected prior to turning on the device, such that the preselected line is automatically selected when the device is turned on.

28. A method for implementing a user interface in a wireless telecommunication device of a communication system, the method comprising the steps of:

displaying a number of identifiers arranged in a plurality of rows and a plurality of columns, wherein at least a subset of identifiers each represent a communication line or a function mapped from a related wired device of the system so as to be accessible through the wireless telecommunication device;

utilizing at least one row select button to select a particular one of the plurality of rows provided in the display; and utilizing at least one column select button to select a particular one of the plurality of columns provided in the display, such that selection of the particular row and the particular column selects a feature associated with the corresponding identifier;

wherein a line corresponding to a given one of the identifiers is preselected prior to turning on the device, such that the preselected line is automatically selected when the device is turned on.

29. A wireless handset for use in a communication system, comprising:

a housing;

a display arranged in the housing, the display providing a number of identifiers arranged in a plurality of rows and a plurality of columns, wherein at least a subset of the identifiers each represent a communication line or a function mapped from a related wired device of he system so as to be accessible through the wireless handset;

at least one row select button for selecting a particular one of the plurality of rows provided in the display; and at least one column select button for selecting a particular one of the plurality of columns provided in the display, such that selection of the particular row and the particular column selects a feature associated with the corresponding identifier;

wherein a line corresponding to a given one of the identifiers is preselected prior to turning on the device, such that the preselected line is automatically selected when the device is turned on.

* * * * *